Feb. 28, 1950  E. BALDINGER  2,498,908
ELECTRONIC IMPULSE COUNTING CIRCUIT
Filed July 18, 1947
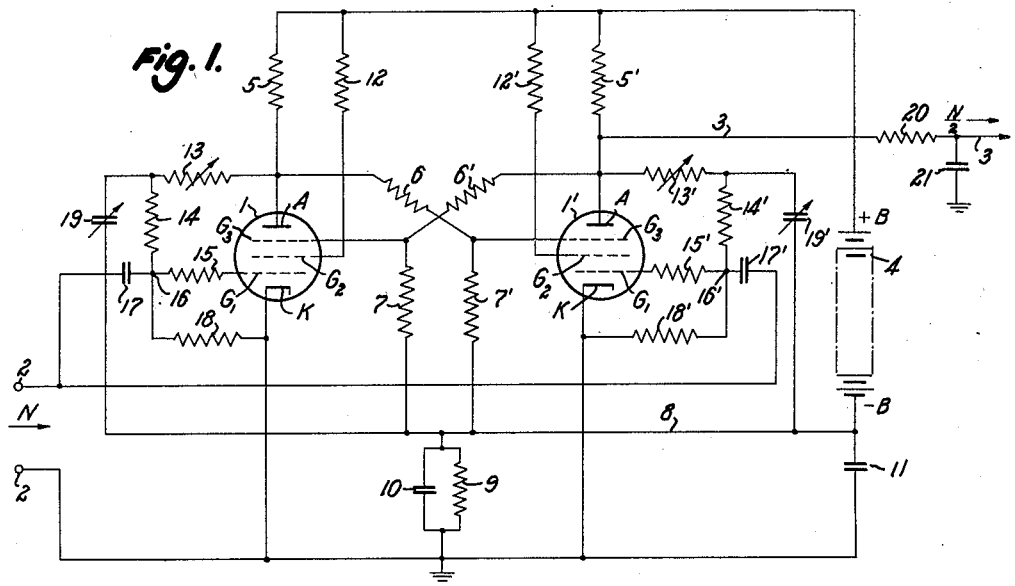
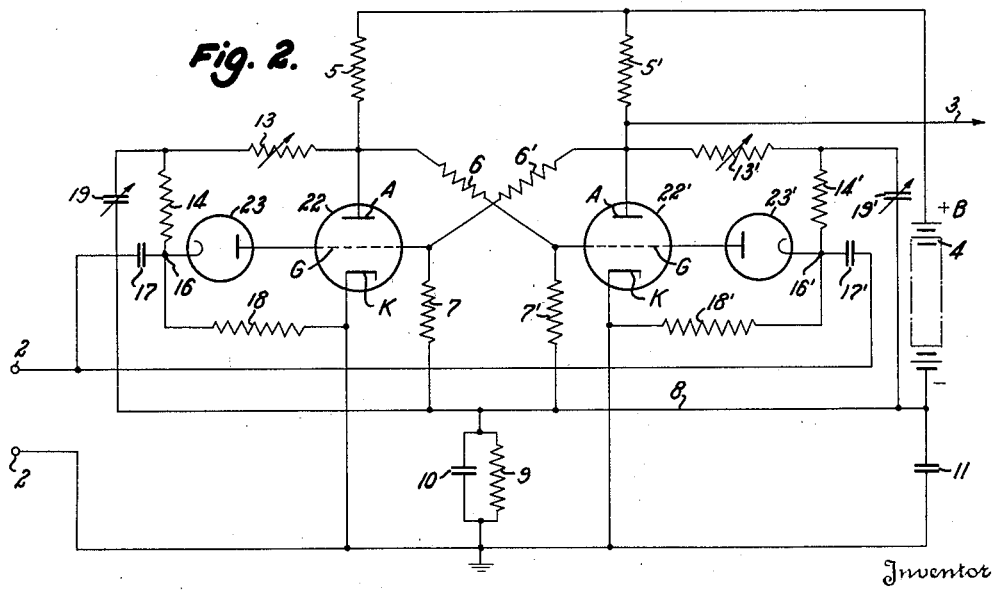
Inventor:
Ernst Baldinger,
By Pierce, Scheffler & Parker,
Attorneys.

Patented Feb. 28, 1950

2,498,908

UNITED STATES PATENT OFFICE 2,498,908

ELECTRONIC IMPULSE COUNTING CIRCUIT

Ernst Baldinger, Basel, Switzerland

Application July 18, 1947, Serial No. 761,963
In Switzerland April 9, 1946

Section 1, Public Law 690, August 8, 1946
Patent expires April 9, 1966

17 Claims. (Cl. 250—27)

This invention relates to an electronic circuit of the type commonly designated an "impulse counting circuit" or, more simply, a "counting circuit."

Such counting circuits are arranged between a source of voltage impulses and a solenoid-operated mechanical counter to permit the totalizing of impulses spaced by time intervals substantially less than the time required to complete a unit actuation of the mechanical counter. The voltage impulses may be developed at a fluctuating rate, for example by cosmic rays, or at a substantially constant rate in the case of apparatus for measuring the frequency of an alternating current or the speed of a rotating shaft. A counting circuit has the operational characteristic of transmitting only a predetermined fraction of the voltage impulses which are impressed upon the circuit, and a plurality of counting circuits may be cascaded to reduce the number of impulses which actuate the counter to a small fraction of the actual number of voltage impulses. Counting circuits are known which include two electronic tubes and associated circuit elements, the tubes being rendered conductive in alternation by successive voltage impulses to transmit only one-half of the number of impressed voltage impulses. Cascaded stages of the basic two-tube circuit will each suppress one-half of the number of input impulses of that stage and in the case of, for example, eight cascaded counting circuits, only one voltage impulse reaches the mechanical counter for each two hundred and fifty-six voltage impulses delivered to the input circuit of the first stage. The prior counting circuits have been very sensitive to the magnitude and the duration of the voltage impulses, and deviation of either of these factors from preselected basic values frequently resulted in erroneous counts.

Objects of the invention are to provide counting circuits which function accurately in the counting of voltage impulses of varying magnitude and/or duration. More specifically, objects of the invention are to provide counting circuits including two tubes which are cross-connected in the general manner of an Eccles-Jordan trigger circuit or a "flip-flop" multivibrator circuit, each tube having a voltage divider connected between plate and control grid, and the incoming voltage impulses being imposed upon the voltage dividers of both tubes.

These and other objects and the advantages of the invention will be apparent from the following specification when taken with the accompanying drawings in which:

Figs. 1 and 2 are diagrams of counting circuits embodying the invention.

In Fig. 1 of the drawings, the reference numerals 1, 1' identify two pentode tubes having electrodes symmetrically connected for operation as a flip-flop multivibrator circuit. Input terminals 2 are connected in the same manner to both tubes, as will be explained in detail hereinafter, and the symmetry of the circuit connections of the two tubes is broken only by the output lead 3 which is connected to plate A of only the tube 1'. The plate circuits of tubes 1, 1' are energized from a voltage source 4, which is shown schematically as a battery but which may be a rectifier-filter assembly operating from a commercial alternating current light and power system; the plates A of the tubes being connected to the positive terminal +B of the voltage source 4 through resistors 5, 5', respectively.

The plates A of tubes 1, 1' are connected through resistors 6, 6' to the screen grids $G_3$ of the other tube, and the grids $G_3$ are connected through individual resistances 7, 7' respectively and lead 8 to the negative terminal of the plate voltage source 4. A common cathode bias resistor 9 for both tubes is connected between the lead 8 and the grounded cathodes K, the bias resistor being shunted by a condenser 10 and the negative terminal of voltage source 4 being connected to ground through a by-pass condenser 11. The grids $G_2$ of the tubes 1, 1' are connected to the voltage source 4 through resistors 12, 12' respectively. The plates A of tubes 1 and 1' are connected to their associated control grids $G_1$ through serially connected resistances 13, 14, 15 and 13', 14', 15', respectively which may all be of the same value. The junctions 16, 16' of resistances 14, 15 and 14', 15' are connected to the non-grounded input terminal 2 through condensers 17, 17' respectively. Voltage impulses are thus impressed simultaneously on the control grids $G_1$ of tubes 1, 1' through condenser 17 - resistance 15 and condenser 17' - resistance 15' respectively. The control grid potentials may be additionally stabilized by resistances 18, 18' connected between the cathodes K and the associated junction points 16, 16' of the potential dividers of tubes 1, 1', respectively, but the resistances 18, 18' may be omitted from other embodiments of the invention.

Condensers 19, 19' are preferably connected between the junctions of resistances 13 and 14, and of resistances 13' and 14', respectively, and the —B lead 8 to maintain the positive preliminary voltages of the points 16, 16' for some time after a change-over of a tube from a non-conducting to a conducting condition, whereby an incoming negative voltage impulse which persists somewhat beyond the change-over interval does not produce a second change-over. It is essential that the condensers be connected between the potential dividers and a point of the network at which the potential does not fluctuate with the change-over of the tubes from blocked to conductive condition. The condensers 19, 19' may be returned to ground or to a fixed or adjustable tap on the plate voltage source.

The condensers 19, 19', and/or one or more of the resistances of the voltage dividers to which the control grids $G_1$ are connected, are adjustable to control the differentiation power of the counting circuit. The differentiation power of the circuit is its characteristic of distinguishing between and counting two impulses which follow one another at a preselected time interval. As illustrated, both the condensers 19, 19' and the voltage divider resistances 13, 13' are adjustable. A filter comprising a series resistance 20 and shunt condenser 21 may be included in the output lead 3 when the input impulses are not simple sine or square waves but include a plurality of voltage peaks.

It is to be noted that the described counting circuit is distinguished from the prior counting circuits by the provision of two voltage dividers connected from the plate of each tube to a point of lower and fixed potential. Some prior counting circuits have included voltage dividers corresponding to the illustrated voltage dividers 6, 7' and 6', 7 in the cross-connection of the plate of each tube to a grid electrode of the other tube. Such voltage dividers and the cross-connections between the electrodes of the tubes establish the basic characteristic of conduction in only one tube at any time and a change-over of the operating conditions of the tubes by successive input signals or voltage impulses. The second voltage divider of each tube is connected between plate and cathode or ground, in the illustrated embodiment, and the control grids of the tubes are connected to points on the second voltage dividers of the same tubes. The input voltage impulses are not impressed directly upon the respective control grids but are impressed upon the second voltage dividers at points spaced from the control grid by impedances.

Only one of the tubes 1, 1' is conductive at any given instant, and the change-over of either tube from conductive to blocked condition automatically renders the other tube conductive. The change-over is effected by incoming negative voltage impulses which are indicated schematically by the arrow N adjacent the input terminals 2, 2, and only one-half of the incoming impulses is transmitted to the output lead 3, as is indicated by the arrow marked $$\frac{N}{2}$$

adjacent that lead. The $$\frac{N}{2}$$

output impulses may be impressed upon the input terminals 2, 2 of another counting circuit or upon the solenoid operator of a mechanical counter.

Assuming that tube 1 is conductive, the potential at its plate A is substantially less than the +B potential on plate A of tube 1' in view of the voltage drop across the resistance 5. The cathodes K of both tubes are at a positive potential with respect to the —B potential of the plate voltage source 4, since a voltage is developed across the cathode bias resistor 9 by the plate current of tube 1 and the K-to-$G_2$ emission current of tube 1'. The suppressor grid $G_3$ of tube 1 is at a relatively high positive potential since it is connected to the junction of resistances 6', 7 of the voltage divider connecting plate A of non-conductive tube 1' and the —B lead 8, but the suppressor grid $G_3$ of tube 1' is at a relatively low positive potential as its voltage divider 6, 7' terminates at plate A of tube 1, the potential of which is relatively low in view of the voltage drop across resistance 5. The potential on grid $G_3$ of tube 1' is less than that on grid $G_2$, and plate conduction is blocked in tube 1' although space current flows to grid $G_2$.

This condition of conduction in tube 1 and blocking of tube 1' persists so long as a negative voltage impulse is not applied to the input terminals 2, 2. Positive voltage impulses have no effect upon the circuit since tube 1 is already conductive, and point 16' of the tube 1' is already at a high positive potential. A negative voltage impulse across input terminals 2, 2 reduces the emission current of tube 1', and blocks conduction through tube 1. This action takes place as the positive voltage on grid $G_1$ of tube 1 is relatively low in view of reduced voltage on plate A of the nonconductive tube 1, the plate A being the high potential terminal of the voltage divider to which grid $G_1$ of tube 1 is connected. A negative input impulse to tube 1 overrides the positive potential on grid $G_1$ of tube 1, thereby blocking conduction in tube 1. The voltage at plate A of tube 1 rises to substantially +B voltage when conduction is blocked, thereby increasing the positive voltage on grid $G_3$ of tube 1' to a value which renders tube 1' conductive. The voltage on anode A of tube 1' thus drops suddenly, and a negative impulse is transmitted to the output lead 3. The potential on grid $G_3$ of tube 1 drops to a low value upon conduction in tube 1', since grid $G_3$ is connected to the junction of resistances 6', 7 of the voltage divider across the plate circuit of tube 1', whereas the potential on control grid $G_1$ of tube 1 is increased to a high positive value by its connection to point 16 on voltage divider 13, 14, 18. The electrical conditions of the tubes are thus reversed, and tube 1' will be blocked by the next negative impulse but no change will be effected by positive impulses. The change-over by a negative voltage impulse on point 16' of the tube 1' network delivers a positive impulse to the output lead 3, but this positive impulse will not be transmitted by a succeeding counting circuit.

The second change-over completes one cycle of operation of the counting circuit, and each two negative voltage impulses at input terminals 2, 2 thus develop a single negative impulse at the output lead 3.

The counting circuit is stable in operation over wide ranges in the magnitude and duration of the input voltage impulses. This stability is obtained by the connection of the control grid of each tube to the potential divider which extends from the plate A of the same tube to a point of lower potential, for example to ground in the Fig. 1 circuit. The differentiation power of the counting circuit may be closely adjusted to a desired value by selection of the effective values of the adjustable elements 13, 19 and 13', 19' respectively.

The condenser 17 and resistance 15 of tube 1, and the corresponding circuit elements of tube 1', form so-called "peaking circuits" which also contribute to stability by converting a voltage wave of sine, square or arbitrary form at input terminals to a peaked wave or sharp voltage impulse at the control grids. Fluctuations in the plate supply voltage have little effect upon stability of operation in view of the cathode bias resistor 9. The output filter, comprising resistor 20 and condenser 21, is not essential when the input voltage impulses are of such form as to develop a single negative voltage peak at the control grids of the tubes.

Other changes may be made in the described circuit, for example the voltage dividers to which the control grids are connected may include capacitive or inductive elements, and the cross-connections of the tubes may be made from the plate of each to the screen or control grid of the other tube, as is shown for example in Fig. 2.

Such circuit elements of the Fig. 2 circuit as correspond to elements of the Fig. 1 circuit are identified by the same reference numerals but will not be described in detail. Triode tubes 22, 22' replace the pentodes of the Fig. 1 circuit, and diodes 23, 23' replace the resistors 15, 15'. The plates A of the tubes are cross-connected to the control grids G by the resistors 6, 6', and the grids G are connected to the —B lead 8 by resistors 7, 7' respectively.

The method of operation of the Fig. 2 circuit is similar to that of the Fig. 1 circuit in that only one tube is conductive at a time, and the change-over of the electrical conditions of the tubes is effected by negative voltage impulses. Positive voltage impulses do not reach the control grids G since the diodes 23, 23' are so connected as to transmit only negative voltage impulses. The control grid G of the blocked tube is maintained at a negative potential with respect to its cathode K by the cross-connection of the plates and control grids. The effective input terminal points 16, 16' of the respective tubes are maintained at high positive potentials by voltages dividers 13, 14, 18 and 13', 14,' 18' when the tube is blocked, but these positive potentials do not reach the control grids G through the diodes 23, 23'.

For simplicity and clarity of illustration, the pentodes, triodes and diodes are shown as separate tubes but it is to be understood that these pairs of electronic devices may be housed within a single evacuated envelope.

The pentode type circuit of Fig. 1 may be modified to impress the voltage impulses upon the suppressor grids $G_3$. The grids $G_1$ are "floating" in this embodiment of the invention, or they may be connected to ground through condenser-resistance circuits for maintaining the blocking of a tube for a preselected interval after a changeover.

When a plurality of counting circuits are cascaded, each successive counting circuit transmits only one-half the impulses of the adjacent earlier stage, and the differentiation power of successive stages can be reduced for increasing stability and accuracy in operation. For example, the capacities of the condensers 19, 19' of each stage are greater than the corresponding condenser capacities of the preceding stage.

It will therefore be apparent that there is considerable latitude in circuit arrangements, and in the relative values of various circuit elements, and that various changes which may occur to those skilled in the art fall within the spirit and scope of the invention as defined in the following claims.

I claim:

1. A counting circuit comprising a pair of electronic tubes each including a plate electrode and at least one grid electrode cooperating with a cathode, cross-connections between the plate electrode of each tube and a grid electrode of the other tube to condition said tubes for conduction in only one tube at any time, a plate load for each tube in series with a plate voltage source, a voltage divider associated with each tube and between the plate thereof, and a point of lower fixed potential, means connecting a grid electrode of each tube to the voltage divider associated with that tube, an input circuit symmetrically connected to correspondingly located points on said voltage dividers, and an output circuit connected to the plate of only one of said tubes.

2. A counting circuit as recited in claim 1, wherein said voltage dividers comprise resistive impedances.

3. A counting circuit as recited in claim 1, wherein each voltage divider comprises three resistances in series between the plate and said point of lower fixed potential, and said means connecting a grid electrode to a voltage divider is a resistance connecting the grid electrode to the associated voltage divider at that terminal of the intermediate resistance thereof which is remote from the plate electrode.

4. A counting circuit as recited in claim 3, wherein said input circuit is connected to each voltage divider at the junction therewith of the resistance connected to the grid electrode.

5. A counting circuit as recited in claim 4, wherein said resistances of the voltage dividers are all of the same value.

6. A counting circuit as recited in claim 4, in combination with condensers connected between a point of fixed potential and the junctions of the intermediate resistances and the resistances connected to the plates of the respective tubes.

7. A counting circuit as recited in claim 1, wherein condensers are connected between a point of fixed potential and points on the respective voltage dividers between the plate terminals thereof and said points to which the input circuit is connected.

8. A counting circuit as recited in claim 7, wherein said point of fixed potential is the negative terminal of said plate voltage source.

9. A counting circuit as recited in claim 1, wherein said means connecting grid electrodes to the associated voltage dividers are resistances of asymmetric conductivity.

10. A counting circuit as recited in claim 1, wherein said means connecting grid electrodes to the associated voltage dividers are rectifiers.

11. A counting circuit as recited in claim 1, wherein said means connecting grid electrodes to the associated voltage dividers are diodes.

12. A counting circuit as recited in claim 1, wherein the cathodes of said tubes are conductively connected, and a common cathode bias resistance is connected between said cathodes and said plate voltage source.

13. A counting circuit as recited in claim 1, in combination with a filter circuit included in said output circuit.

14. A counting circuit as recited in claim 13, wherein said filter circuit comprises a series resistance and a shunt condenser connected between the output side of said series resistances and a point of fixed potential.

15. A counting circuit as recited in claim 1 wherein said tubes each have at least two grid electrodes, the inner grid electrode of each tube being connected by said connecting means to the associated voltage divider, and the outer grid electrodes being cross-connected to the plates of the other tubes.

16. A counting circuit as recited in claim 1 wherein said tubes are triodes, and said means connecting the grid electrodes to the voltage dividers are rectifiers.

17. A counting circuit as recited in claim 1 wherein said tubes are triodes, and said means connecting the grid electrodes to the voltage dividers are diodes.

ERNST BALDINGER.

REFERENCES CITED

The following references are of record in the file of this patent:

Proceedings of the Cambridge Philosophical Society, vol. 33, 1937, "A Scale-of-Two High-Speed Counter," by Lewis, pages 549–553. (Copy in Division 10.)

Review of Scientific Instruments, vol. 9, July 1938, "New Vacuum Tube Counting Circuits," by Reich, pages 222–23. (Copy in Division 10.)

Review of Scientific Instruments, vol 17, May 1946, "Design and Use of Directly Coupled Pentode Trigger Pairs," by Regener, pages 180–184, (Copy in Division 10.)